United States Patent Office 3,046,086
Patented July 24, 1962

1

3,046,086

PREPARATION OF HALODECABORANE

Paul R. Wunz, Jr., Gibsonia, Pa., assignor to Callery Chemical Company, Pittsburgh, Pa., a corporation of Pennsylvania No Drawing. Filed Feb. 19, 1959, Ser. No. 794,260
6 Claims. (Cl. 23—14)

This invention relates to the preparation of halodecaboranes using a haloform as the halogenating agent.

Although decaborane $B_{10}H_{14}$ has been known for many years, in recent years it has become more than a laboratory curiosity and considerable research effort has been directed toward the preparation of it and its derivatives. Similarly, certain halodecaboranes, i.e., $B_{10}H_{12}Br_2$ and $B_{10}H_{12}I_2$, were prepared many years ago by Alfred Stock and his co-workers, but these compounds have not achieved any significant importance as yet, probably because of the lack of an attractive preparative method. The method used by Stock involved direct halogenation of decaborane with a halogen; low yields, long reaction times and the necessity for elevated temperatures characterized this method.

It is accordingly one object of this invention to provide a new and easily practiced method for the preparation of halodecaboranes.

Another object is to provide a method by which economical yields of halodecaboranes may be obtained in short reaction times at moderate temperatures.

Other objects will become apparent from time to time hereinafter.

This invention is based upon the discovery that a haloform, $CHX_3$ where X is chlorine, bromine or iodine, will react with decaborane in the presence of a Friedel-Crafts catalyst to produce halodecaboranes.

The reaction takes place readily upon contacting the reactants in the presence of the catalyst at room temperature and generally produces a mixture of mono- and dihalodecaboranes. It has been found, however, that the degree of substitution in the decaborane molecule by the halogen depends to a significant extent upon the temperature at which the reaction is carried out. Thus, when the reaction is carried out at low temperatures, such as room temperature (about 25° C.) or slightly above, the product is predominantly monohalodecaborane, $B_{10}H_{13}X$. If somewhat higher temperatures are used, e.g., 50 to 60° C., the product obtained consists primarily of dihalodecaborane, $B_{10}H_{12}X_2$. Even higher temperatures, up to the decomposition temperatures of the reactants and products may be used if desired, although the reaction at 60° C. takes place rapidly so that to do so in order to increase the rate of reaction is not generally necessary.

Although a solvent or liquid medium is not necessary to carry out the reaction, any inert liquid may be used as a reaction medium. The use of a solvent or liquid reaction medium is often desirable in order to facilitate mixing, heating and handling operations. Saturated liquid hydrocarbons, such as pentane or hexane, are examples of liquids suitable for use as a solvent or reaction medium.

The pressure at which the reaction is carried out is not critical. Atmospheric pressure is entirely suitable and usually is most convenient in practice.

The invention will be discussed further in connection with the following examples, which, however, are not to be construed as limiting the scope of the invention but only as illustrative thereof.

*Example I.*—Decaborane (20 millimoles) and chloroform, $CHCl_3$ (40 millimoles), were heated along with aluminum chloride, $AlCl_3$ (4 millimoles), and the mixture was kept at 57 to 62° C. for 15 minutes. The reaction mixture was then cooled and the volatile products removed. They consisted of methylene chloride, $CH_2Cl_2$ (31.9 millimoles), methyl chloride, $CH_3Cl$ (0.98 millimole), and hydrogen chloride, HCl (1.56 millimoles), along with unreacted chloroform (4.8 millimoles). The non-volatile products were treated with water and hexane to destroy the catalyst and then filtered hot from boiling hexane. A light yellow solid was obtained; upon analysis it was determined to be a mixture of boric acid and chlorodecaboranes. The filtrate was concentrated and 1.28 grams of a white solid was recovered. The solid was determined by infra-red, ultra-violet and X-ray analyses to be dichlorodecaborane, $B_{10}H_{12}Cl_2$. It melted at 115 to 122° C. and it analyzed 55.7% boron and 34.6% chlorine; the theoretical composition of $B_{10}H_{12}Cl_2$ is 56.7% boron and 37.0% chlorine.

*Example II.*—Decaborane (10 millimoles), bromoform, $CHBr_3$ (20 millimoles), and aluminum chloride (2 millimoles) were brought together at room temperature and allowed to stand for two hours. The volatile products were then removed; they consisted of typical reduction products of $CHBr_3$. The non-volatile residue was treated with water and pentane. Most of the material (1.55 grams) was insoluble in both solvents. It was analyzed by X-ray diffraction and infra-red analyses and found to be a mixture of monobromodecaborane and dibromodecaborane, with the monobromo-derivative predominating.

A similar reaction using aluminum bromide instead of aluminum chloride produced essentially the same products, but at an appreciably faster rate. It is believed that this was due to the higher solubility of aluminum bromide in bromoform.

Iodoform, $CHI_3$, may also be used in place of the chloroform or bromoform. When using this substance it is preferred to carry out the reaction in a solvent, since iodoform is a solid. Any inert solvent, such as the saturated hydrocarbons mentioned above, may be used.

As ways used in the above examples, aluminum halides such as aluminum chloride are the preferred catalysts for use in this method. However, other Friedel-Crafts catalysts, i.e., catalysts useful in Friedel-Crafts alkylation processes, may also be used in place of the aluminum halides. Such catalysts include, for example, ferric chloride, zinc chloride, and stannic chloride.

The halodecaboranes are toxic to various insects and for this reason are useful as pesticides. They are particularly valuable for the massive treatment of nesting places of certain insects, such as ants, where the vapors due to the vapor pressure of the halodecaborane permeate throughout the nest and result in destruction of the insects and their young. For such treatment, the more volatile halodecaboranes are preferred.

The halodecaboranes may also be utilized as intermediates in the preparation of various boron compounds, such as organo derivatives of boranes. Their value in this regard lies in their reactivity due to the presence of the boron-halogen bonds.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. A method of preparing halodecaboranes which comprises contacting decaborane with a haloform of the formula $CHX_3$ where X is selected from the group consisting of chlorine, bromine and iodine in the presence of a Friedel-Crafts catalyst selected from the group consisting of aluminum chloride, aluminum bromide, ferric chloride, zinc chloride and stannic chloride, and recovering the halodecaboranes thus formed.

2. A method in accordance with claim 1 in which the Friedel-Crafts catalyst is aluminum chloride.

3. A method in accordance with claim 1 and carried out at about 25° C.

4. A method in accordance with claim 1 and carried out at about 60° C.

5. A method of preparing chlorodecaboranes which comprise contacting decaborane with chloroform in the presence of a Friedel-Crafts catalyst comprising aluminum chloride and recovering the chlorodecaboranes thus formed.

6. A method of preparing bromodecaboranes which comprise contacting decaborane with bromoform in the presence of a Friedel-Crafts catalyst comprising an aluminum bromide and recovering the bromodecaboranes thus formed.

References Cited in the file of this patent

Gaylord: "Reduction With Complex Metal Hydrides," 1956, pages 890, 891, 894, 889, 892 and 893.

Hurd: "Chemistry of the Hydrides," 1952, page 83.

Thomas: "Anhydrous Aluminum Chloride in Organic Chemistry," 1941, pages 874–878.